United States Patent
Ivanenko et al.

(10) Patent No.: US 11,409,117 B2
(45) Date of Patent: Aug. 9, 2022

(54) DEVICE FOR GENERATING A LINEAR INTENSITY DISTRIBUTION IN A WORKING PLANE

(71) Applicant: LIMO Display GmbH, Dortmund (DE)

(72) Inventors: Mikhail Ivanenko, Essen (DE); Viacheslav Grimm, Sankt Petersburg (DE); Markus Wiesner, Iserlohn (DE); Henning Kalis, Dortmund (DE); Fabian Gaußmann, Dusseldorf (DE); Florian Seck, Unna (DE)

(73) Assignee: LIMO DISPLAY GMBH, Dortmund (DE)

( * ) Notice: Subject to any disclaimer, the term of this patent is extended or adjusted under 35 U.S.C. 154(b) by 47 days.

(21) Appl. No.: 16/979,696

(22) PCT Filed: Mar. 13, 2020

(86) PCT No.: PCT/EP2020/056976
§ 371 (c)(1),
(2) Date: Sep. 10, 2020

(87) PCT Pub. No.: WO2020/187794
PCT Pub. Date: Sep. 24, 2020

(65) Prior Publication Data
US 2021/0141233 A1    May 13, 2021

(30) Foreign Application Priority Data

Mar. 18, 2019  (DE) .......................... 102019106875.4
Dec. 20, 2019  (EP) ..................................... 19218582

(51) Int. Cl.
*G02B 27/09* (2006.01)
*G02B 27/30* (2006.01)

(52) U.S. Cl.
CPC ....... *G02B 27/0927* (2013.01); *G02B 27/0911* (2013.01); *G02B 27/0966* (2013.01); *G02B 27/30* (2013.01)

(58) Field of Classification Search
CPC ............ G02B 27/0927; G02B 27/0966; G02B 27/0911; G02B 13/08; B23K 26/0738
See application file for complete search history.

(56) References Cited

U.S. PATENT DOCUMENTS 5,825,551 A   10/1998  Clarkson et al.
7,782,535 B2   8/2010  Mikliaev et al.
(Continued)

*Primary Examiner* — Ryan D Howard
(74) *Attorney, Agent, or Firm* — Ipro, PLLC

(57) ABSTRACT

Device for generating a linear intensity distribution in a working plane (20), comprising at least one laser light source (11), optics (14) which shape the light (12) emitted by the at least one laser light source (11) in a first direction (X) and/or in a second direction (Y), a beam transformation device (13) increasing the beam quality factor ($M_x^2$) with respect to the first direction (X) and decreasing the beam quality factor ($M_y^2$) with respect to the second direction (Y), as well as an objective (17) acting in the second direction (Y) and a focusing device (18) acting in the second direction (Y), which is arranged behind the objective (17), wherein the objective (17) and the focusing device (18) image into the working plane (20) a plane (19) behind the beam transformation device (13) in which the light (12) in the second direction (Y) has an intensity distribution with a super-Gaussian profile or with a profile similar to a super-Gaussian profile.

14 Claims, 6 Drawing Sheets

(56) References Cited

U.S. PATENT DOCUMENTS

| | | | |
|---|---|---|---|
| 8,270,084 B2 * | 9/2012 | Mikliaev | G02B 19/0095 |
| | | | 359/618 |
| 2008/0225257 A1 | 9/2008 | Kita | |
| 2012/0057345 A1 | 3/2012 | Kuchibhotla | |
| 2014/0027417 A1 | 1/2014 | Simon et al. | |

* cited by examiner

Δz' = -0,5 mm

Δz' = -0,4 mm

Δz' = -0,3 mm

Δz' = -0,2 mm

Δz' = 0 mm

Δz' = 0,2 mm

Δz' = 0,3 mm

Δz' = 0,4 mm

Δz' = -0,2 mm

Δz' = -0,1 mm

Δz' = 0 mm

Δz' = 0,2 mm 2, 13

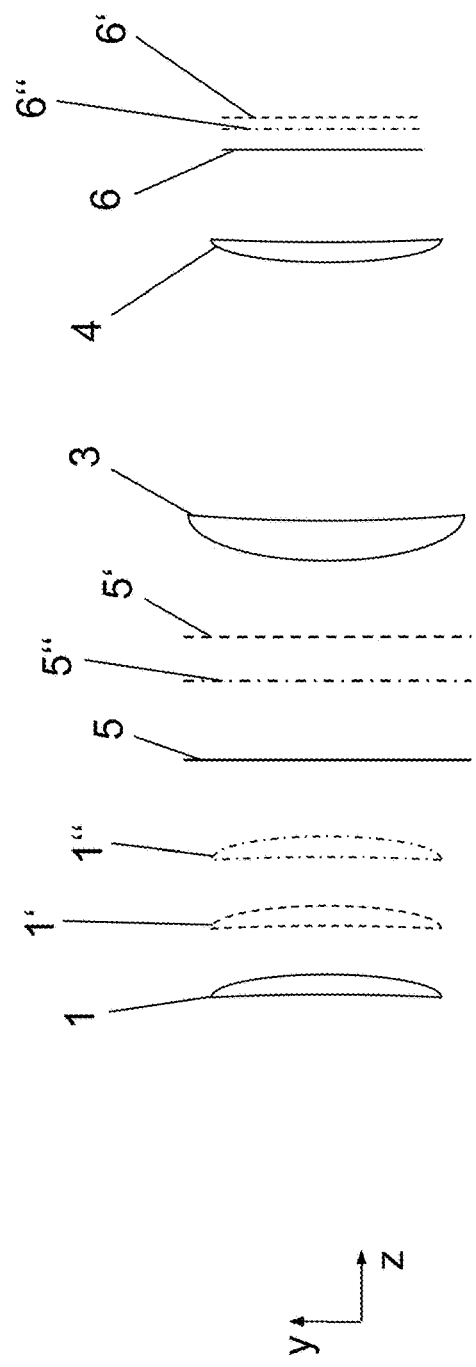

DEVICE FOR GENERATING A LINEAR INTENSITY DISTRIBUTION IN A WORKING PLANE

The present invention concerns a device for generating a linear intensity distribution in accordance with the preamble of claim 1.

Definitions: In the direction of propagation of the laser radiation means the average direction of propagation of the laser radiation, especially if it is not a plane wave or at least partially divergent.

Figure 5:
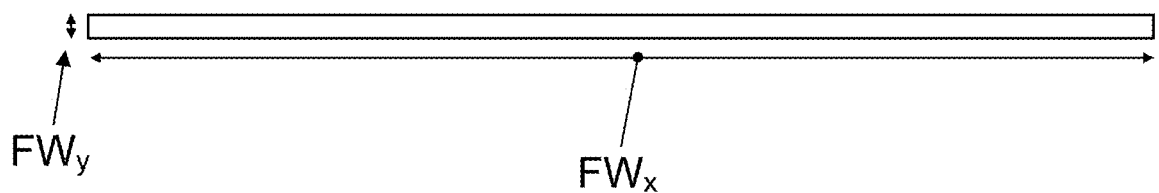

Very narrow laser lines with a transverse line width $FW_y$ of 30 µm to 70 µm, for example, are often required for surface processing such as for laser lift-off or for Si annealing of display panels. FIG. 5 schematically illustrates such a laser line with a width $FW_y$ in the transverse direction and a width $FW_x$ in the longitudinal direction. In the transverse direction, the narrow laser lines often show Gaussian intensity distributions. With a Gauss profile, unwanted thermal side effects on the treated material can occur due to increased intensity in the middle of the profile.

At the same time, large-area applications also require a considerable depth of focus due to the unevenness of a panel to be processed and vibrations during scanning. The often required depth of field is at least 0.5 mm, larger values are advantageous. The depth of field is proportional to the square of the line width $FW_y$ and inversely proportional to the beam quality factor of the laser beam $M^2$. For high-power multimode lasers such as solid-state lasers, $M^2 \gg 1$, typically 15 to 30. This makes it difficult or practically impossible to achieve a small line width in the transverse direction $FW_y$ and at the same time the required large depth of field.

In order to meet both requirements, a lossless asymmetric mode transformation can be applied. Such devices for laser lines with Gaussian cross-section are known from U.S. Pat. No. 7,782,535. With the method described therein, the $M^2$ factor for the direction of focusing or the transverse direction Y is reduced several times, e.g. 20 times, thereby greatly increasing the focusability and depth of field.

A device of the type mentioned above is known from U.S. Pat. No. 8,270,084. The beam transformation device described therein allows a variable line cross section, tip-shaped or Tophat similar, to be formed after a beam transformation device.

Figure 10:
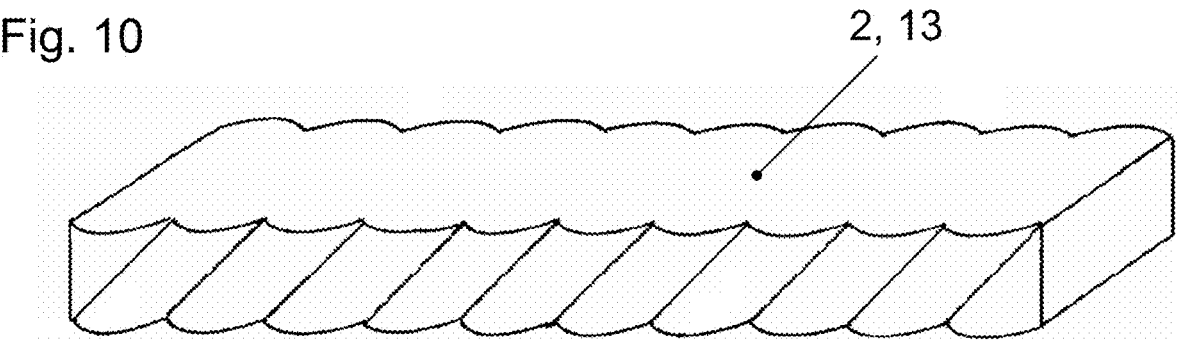

The main idea of this state of the art is the use of a movable cylindrical lens 1 (see FIG. 11) behind a beam transformation device, which can correspond to the beam transformation device 2 shown in FIG. 10, for example. Depending on the position of the cylindrical lens 1 along the optical axis Z (see the dotted or chain dotted positions 1' and 1"), the lens 1 either produces a Fourier transformation or an image of the light field immediately behind the beam transformation device for the Y-direction. Behind the cylindrical lens 1 there is a projection system consisting of the cylindrical lenses 3 and 4 (see FIG. 11) with a telecentric course of main beams at the entrance and exit. The projection system transmits a plane 5, 5', 5" behind the cylindrical lens 1 with a strong reduction for the Y-direction to the desired working plane 6, 6', 6". Depending on the position of the cylindrical lens 1, a peak-shaped intensity distribution 7b, which corresponds to the Fourier transformation of a Tophat distribution (see FIG. 12b), or a super-Gaussian-like intensity distribution 7d (see FIG. 12d) for the Y-direction can occur in the working plane 6, 6', 6".

Figure 4:
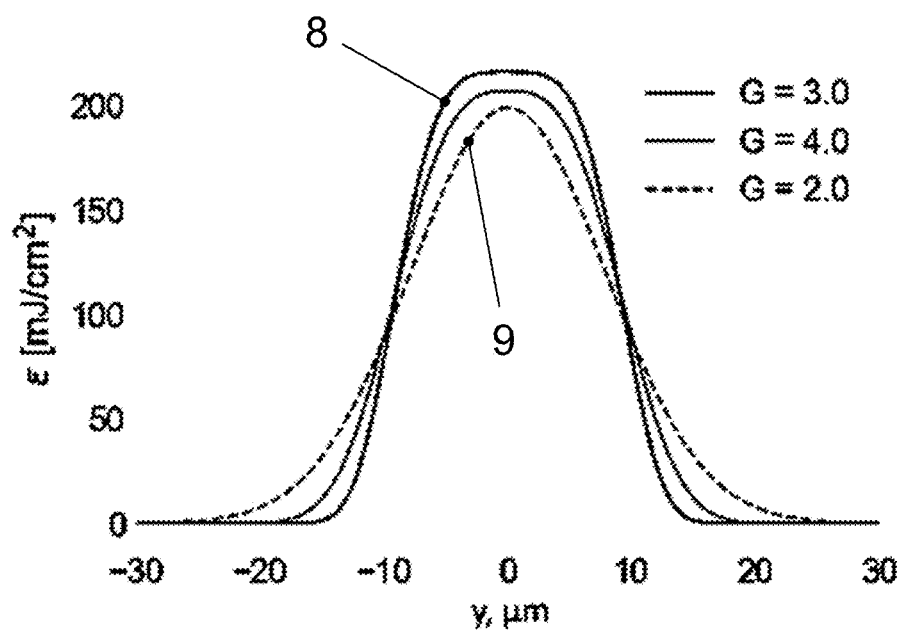

A super-Gaussian line cross section, for example like the energy density 8 shown in FIG. 4 in line transverse direction with a super-Gaussian factor G=4, offers substantial advantages compared to a Gaussian energy density 9 with a super-Gaussian factor G=2, because the flattened intensity distribution offers a broader field of action without thermal side effects. The super Gaussian factor G results from the following formula for the energy density:

$$\epsilon(y) = \mathcal{N}(G) \cdot \exp\left(-2\left[\frac{|y - y_0|}{FW}\right]^G\right)$$

where G=3 and G=4 for super-Gaussian profiles compared to a Gaussian profile where G=2, where y is the coordinate in the transverse direction of the line and where FW is the width $FW_y$ in the Y-direction, where the energy density has dropped to $1/e^2$.

The productivity of a super-Gaussian distribution is increased by the fact that the required process energy density $\epsilon_p$ is achievable with a wider line than with a Gaussian intensity distribution.

For further evaluation with respect to a super-Gaussian line cross section, the following optical example configuration shall be considered: According to U.S. Pat. No. 8,270,084, the device should have a super-Gaussian intensity distribution 7a immediately behind the beam transformation device, as shown in FIG. 12a, for example with a width $FW_y$ of 1 mm in the Y direction.

In the illustrated position 1", which preferably is to be arranged 480 mm behind the beam transformation device, the cylindrical lens 1 with a focal length of f=160 mm images the super-Gaussian intensity distribution reduced by a factor of 2 and 240 mm behind the cylindrical lens 1 into the plane 5".

The telecentric system consisting of cylinder lenses 3 and 4, for example with focal lengths of 4,332 mm and 195 mm, transmits the area 5" to the target area or working plane 6 in a strongly reduced size. The reduction factor F can be 22 because of F=4332/195. Due to the reduction by 2 and the reduction by 22, the super-Gaussian line width $FW_y$=1 mm/2/22=23 µm is roughly estimated.

An essential disadvantage of this scheme is to be seen in the fact that also with the arrangement of the cylindrical lens 1 in the lens position 1" in the range 5, 5', 5" a peak-shaped intensity distribution exists, namely in the rear focal plane, which is arranged about f=160 mm behind the cylindrical lens 1, thus about at a distance $\Delta z$ of 80 mm in front of the super-Gaussian distribution. In the target space or in working plane 6, 6', 6", this distance decreases inversely proportional to $F^2$, so that the distance in the target space is $\Delta z' = \Delta z/F^2$. Thus the distance $\Delta z'$=80 mm/$22^2$=0.17 mm. As a result, the two distributions are not sufficiently separated in the target space.

In addition, the super-Gaussian intensity distribution does not correspond to the highest intensity or the narrowest line. In the example, the line width at the narrowest point corresponding the imaging of the peak-shaped intensity distribution in the focal plane of the lens 1 is only about 2*160*(NA=0.0003)/22=4.3 µm. The depth of field for the super-Gaussian distribution is therefore very small.

For the example described, FIG. 9a to FIG. 9d raytracing simulation results show the change of the super-Gaussian profile along the optical axis Z. In the raytracing simulation, a value of 26 µm is obtained for the line width at the point $\Delta z'$=0. It turns out that already at a distance of $\Delta z'$=0.2 mm the line width is about 58 µm or at a distance of $\Delta z'$=−0.2 mm the line width is about 10 µm. Thus, the raytracing confirms the above estimations. The super-Gaussian profile thus decays very quickly with increasing distance from the point $\Delta z'=0$.

On the basis of this state of the art, the present invention has the task of further developing a device of the type mentioned at the beginning in such a way that the super-Gaussian intensity distribution for transversal direction is formed in the working plane, that has a large depth of field, and/or that the intensity distribution in the working plane has the highest intensity.

According to the invention, this is achieved by means of a device of the type mentioned at the beginning with the characteristic features of claim 1. The subclaims concern preferred forms of the invention.

According to claim 1 the device comprises an objective acting in the second direction and a focusing device acting in the second direction and arranged behind the objective, the objective and the focusing device imaging into the working plane a plane behind the beam transformation device in which the light in the second direction has an intensity distribution with a super-Gaussian profile or with a profile similar to a super-Gaussian profile.

This design allows the super-Gaussian profile to change as slowly as possible along the optical axis or the direction of propagation of the light, so that the greatest possible depth of field is achieved. The super-Gaussian profile can correspond to the position of the highest line intensity and changes only slowly at the distance from the focus. The projection system formed by the objective and the focusing device can image the super-Gaussian distribution from the near field of the beam transformation device in focus into the working plane. At the same time, the Gaussian-like far field distribution of the beam transformation device can be imaged far away from the focus outside the desired depth of field.

The objective may be a long focal length objective, particularly where the focal length of the objective is between 2,000 mm and 30,000 mm, preferably between 5,000 mm and 20,000 mm, for example between 7,000 mm and 13,000 mm.

It may be provided that the objective comprises at least two lenses which are in particular designed as cylindrical lenses acting in the second direction.

It may also be provided that the objective comprises three lenses, in particular three cylindrical lenses acting in the second direction, at least one, preferably at least two, of which can be moved relative to the other lenses in order to vary the line width in the second direction. The lens, preferably long focal length, can thus be designed as a zoom lens with variable focal length to vary the line width.

It may be provided that the focusing device comprises one or more lenses, in particular cylindrical lenses, acting in the second direction.

The rear focal plane of the objective may coincide with the front focal plane of the focusing device. Furthermore, the plane imaged by the objective and the focusing device in the working plane may be arranged between the front focal plane of the objective and the first lens of the objective.

It may be provided that the depth of field of the profile of the intensity distribution, in particular of the super-Gaussian profile or profile similar to a super-Gaussian profile, in the working plane is greater than 0.1 mm, preferably greater than 0.5 mm, the super-Gaussian factor G preferably being >3 in this region. Such depths of field and super-Gaussian factors result in high productivity for most applications.

The intensity distribution, in particular the super-Gaussian intensity distribution or the intensity distribution similar to a super-Gaussian intensity distribution, may have a greater intensity in the working plane than in planes arranged immediately in front of or behind it.

It is possible that the laser light source is a multimode laser light source, for example a multimode solid state laser. The laser beams of such laser light sources have high powers and beam quality factors $M^2$ for example between 15 and 30, so that they are suitable for the beam transformations provided by the device.

It may be provided that the optics are anamorphic optics disposed in particular between the laser light source and the beam transformation device. Anamorphic optics can be used, for example, to create an elongated intensity distribution in the first direction, which is divided into partial beams before or directly in the beam transformation device with regard to the first direction.

It is possible for the device to include a homogenizing device acting in the first direction. The homogenization device may be arranged in particular behind the beam transformation device and preferably in front of the objective. The homogenizer may comprise two cylindrical lens arrays and a Fourier lens acting in the first direction. The homogenizing device can ensure a highly homogeneous intensity distribution along the first direction in the working plane.

Figure 1:
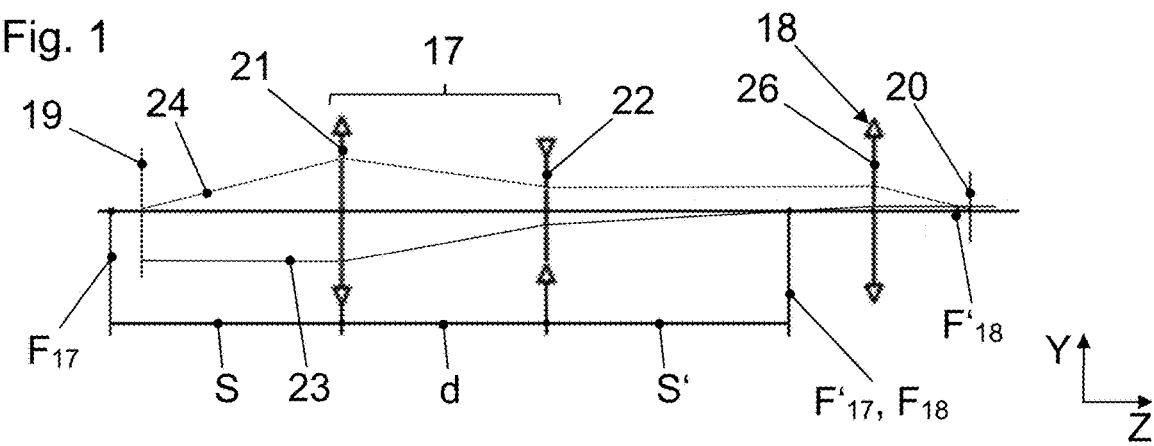
Figure 2:
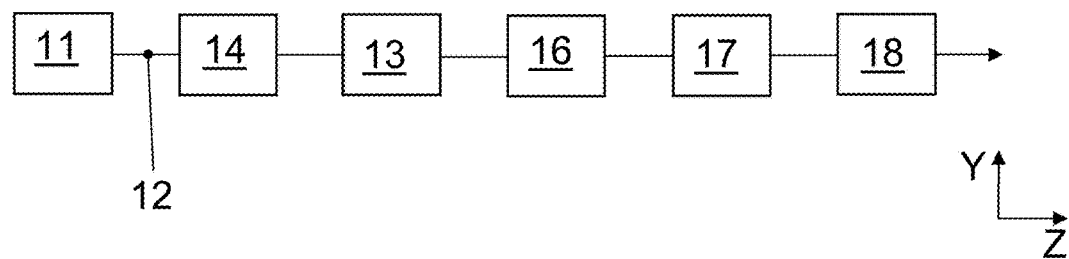
Figure 3A:
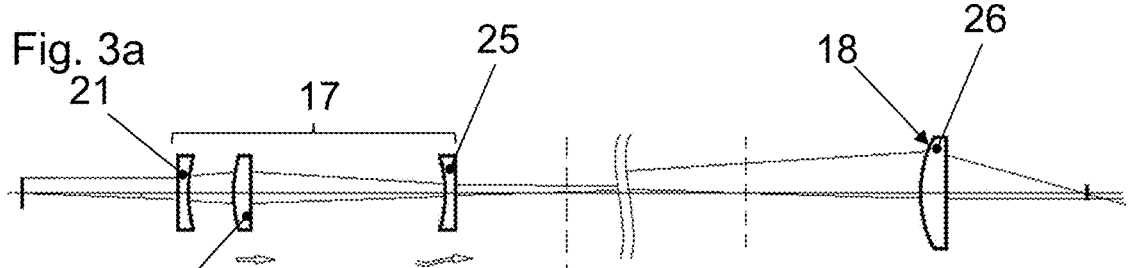
Figure 3B:
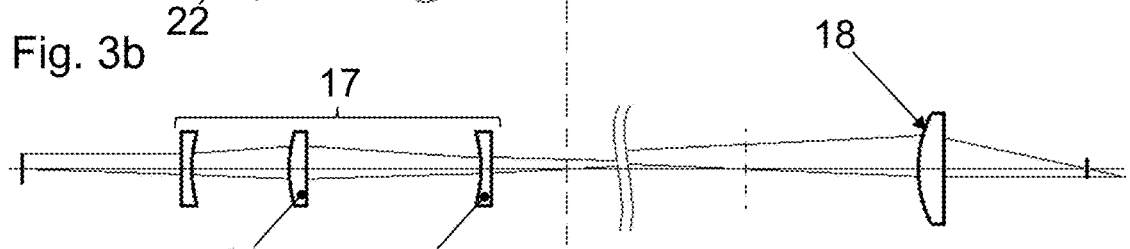
Figure 3C:
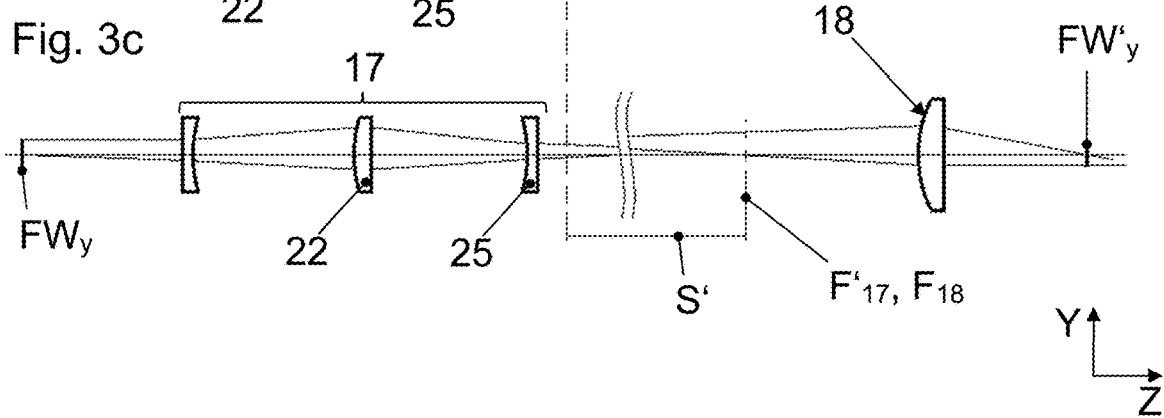
Figure 6:
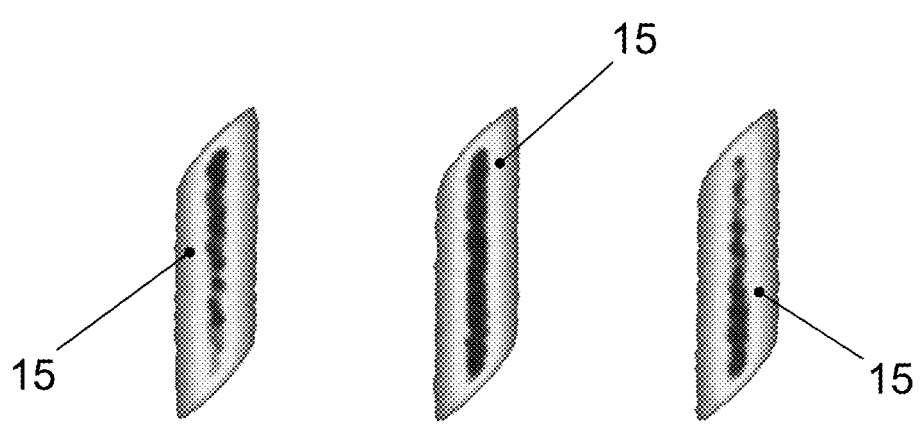
Figure 8:
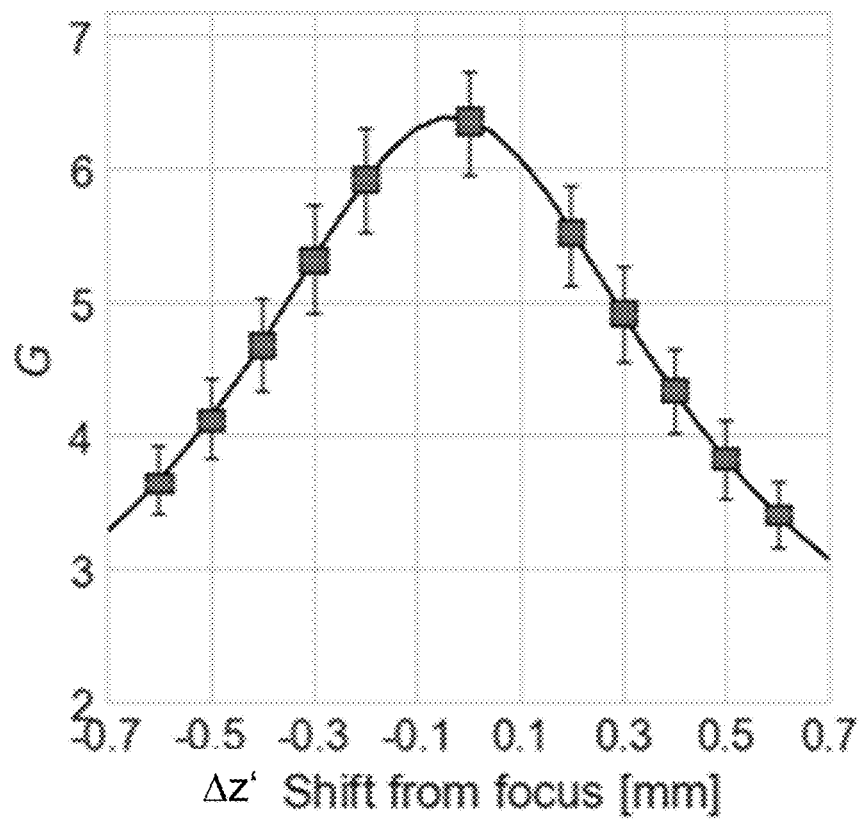
Figure 9A:
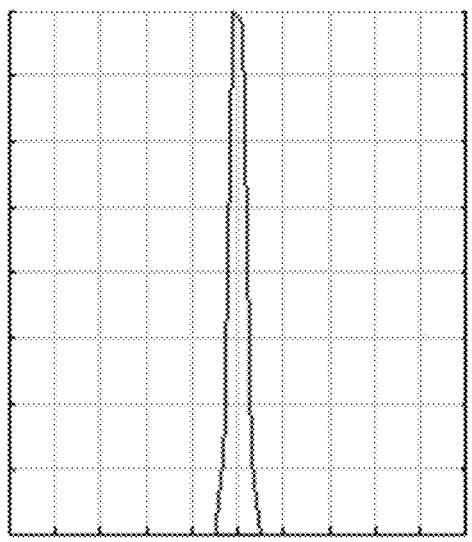
Figure 9B:
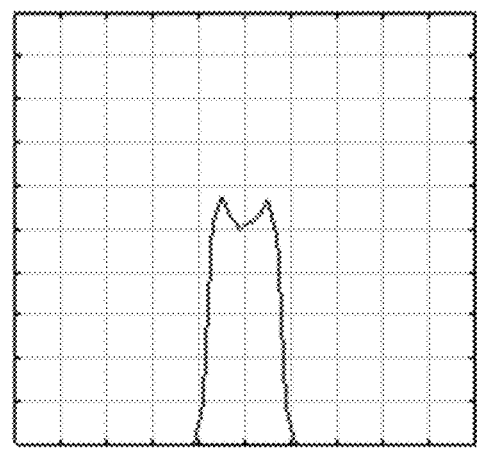
Figure 9C:
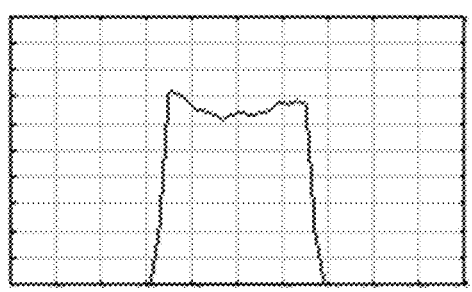
Figure 9D:
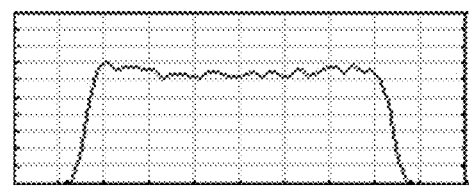

Further features and advantages of the invention are illustrated by the following description of preferred embodiments with reference to the enclosed drawings. Therein shows:

FIG. 1 a schematic side view of a part of a first embodiment of a device according to the invention, the side view showing an objective and a focusing device;

FIG. 2 a schematic side view of the first embodiment of a device according to the invention in which an optional homogenizing device is illustrated;

FIG. 3a a schematic side view of a part of a second embodiment of a device according to the invention, the side view showing an objective and a focusing device, wherein the lenses of the objective are in a first position;

FIG. 3b a schematic side view of the device as shown in FIG. 3a, the lenses of the objective being in a second position;

FIG. 3c a schematic side view of the device as shown in FIG. 3a, the lenses of the objective being in a third position;

FIG. 4 a diagram that schematically illustrates energy density profiles of super-Gaussian and Gaussian profiles at different values of the factor G;

FIG. 5 schematically a linear intensity distribution with clarification of the line width in longitudinal direction and the line width in transverse direction;

FIG. 6 schematically the intensity distribution in the near field behind three lenses of a beam transformation device;

FIG. 7a-h Raytracing simulation results illustrating, for an example configuration of a device according to FIG. 1, the variation of the super-Gaussian profile along the optical axis;

FIG. 8 a diagram showing the change in the super Gaussian factor G along the optical axis;

FIG. 9a-d Raytracing simulation results which, for an example configuration of a device according to U.S. Pat. No. 8,270,084, illustrate the change of the super-Gaussian profile along the optical axis;

FIG. 10 a perspective view of an exemplary beam transformation device;

FIG. 11 schematic side view of a part of a device according to U.S. Pat. No. 8,270,084;

FIG. 12a-d intensity distributions in line transverse direction for different positions of a cylindrical lens of the device according to FIG. 11.

In the figures, identical and functionally identical parts are provided with the same reference signs. In addition, some of the figures have Cartesian coordinate systems drawn into them for clarification.

The embodiments disclose a device for generating a laser beam with a linear intensity distribution in a working plane. FIG. 5 shows schematically and not to scale such a linear intensity distribution having a width $FW_x$ in a first direction X corresponding to the longitudinal direction of the line and a width $FW_y$ in a second direction Y perpendicular to the first direction X corresponding to the transverse direction of the line. In the working plane, the laser radiation has a super-Gaussian intensity distribution in the transverse direction or in the second direction Y, respectively.

The embodiments shown include one or more laser light sources 11, such as a multimode solid-state laser emitting light 12 (see FIG. 2). In particular, the light source 11 may have a beam quality factor $M^2 \gg 1$.

The embodiments shown also include a beam transformation device 13 for improving beam quality in the narrow axis or Y-direction and for mode enrichment in the long axis or X-direction.

Anamorphic optics 14 are provided between the laser light source 11 and the beam transformation device 13. The anamorphic optics 14 form the required beam cross-sections and divergences for the first and second directions X, Y for the downstream beam transformation device 13.

In the first direction X, for example, an elongated intensity distribution is produced, which is divided into N partial beams with an identical width in front of or directly in the beam transformation device 13 with respect to the first direction X. The intensity distribution is divided into N partial beams with an identical width. The beam transformation device 13 spatially rearranges these partial beams in such a way that $M'^2_y$ for the second direction Y becomes significantly smaller and $M'^2_x$ for the first direction X significantly larger than $M^2$ of the original laser beam: $M'^2_y = M^2/N$ and $M'^2_x = M^2*N$.

The beam transformation device 13, for example, can be designed as described in U.S. Pat. No. 8,270,084 or illustrated in FIG. 10 as a refractive cylindrical lens array telescope in which the cylindrical axes of the cylindrical lenses are rotated by 45° about the Z-direction or include an angle of 45° with the first and second directions X, Y.

It is also possible to provide other refractive or reflective beam transformation devices, such as in the U.S. Pat. No. 5,825,551, which perform the same function.

The beam transformation device 13 generates a series of equally sized partial beams 15 with super-Gaussian-like profiles in the second direction Y (see FIG. 6) at the output side in the near field. The far field is arranged at a distance of several meters behind the beam transformation device 13, for example, and can have a Gaussian distribution.

An optional homogenization device 16 acting in the first direction X is provided behind the beam transformation device 13, which homogenization device 16 can be designed, for example, as an imaging homogenizer and can have two cylindrical lens arrays and a Fourier lens acting in the first direction X. The homogenization device 16 can be designed, for example, as an imaging homogenizer and can have two cylindrical lens arrays as well as a Fourier lens acting in the first direction X. The task of the homogenizing device 16 is to ensure a highly homogeneous intensity distribution in the working plane along the first direction X and, by mixing the partial beams 15, also to compensate for any asymmetry of the partial beams 15 in the second direction Y (compare, for example, the left and the right partial beams 15 in FIG. 6), so that an identical super-Gaussian cross section is achieved along the entire line.

The device shown also includes a long focal length objective 17 and a focusing device 18 for the second direction Y or the transverse direction of the line, respectively. The objective 17 and the focusing device 18 are arranged behind the beam transformation device 13 and behind the homogenization device 16, respectively.

The objective 17 and the focusing device 18 together form a projection system for the second direction Y. The projection system images the super-Gaussian intensity distribution from the near field of the beam transformation device 13 (see plane 19 in FIG. 1) into a working plane 20, whereby the Gaussian-like far field distribution behind the beam transformation device 13 is located far away from the focus outside the desired depth of field.

The objective 17, for example, can have two cylindrical lenses 21, 22 which are arranged one behind the other at a distance d in the Z-direction. For example, the focusing device 18 may have one cylindrical lens 26 or several cylindrical lenses acting in the second direction Y (see FIG. 1 and FIG. 3). The rear focal plane $F'_{17}$ of the objective corresponds to the front focal plane $F_{18}$ of the focusing device 18. The plane 19, in which the super-Gaussian intensity distribution from the near field of the beam transformation device 13 is arranged, lies between the front focal plane $F_{17}$ of the objective 17 and the first cylindrical lens 21 of the objective 17.

FIG. 1 illustrates by the beam 23 that the projection system transmits a Gaussian-like distribution from the far field of the beam transformation device 13 into infinity. FIG. 1 further illustrates by the beam 24 that the projection system images the near field of the beam transformation device 13 with the super-Gaussian distribution from plane 19 into the area of the rear focal plane $F'_{18}$ of the focusing device 18.

The magnification V of such a projection system with spatially identical positions for the rear focal plane $F'_{17}$ of the objective and the front focal plane $F_{18}$ of the focusing device 18, remains constant for any position of plane 19 relative to the cylindrical lens 21:

$$V = -f'_{17}/f'_{18} = FW_y/FW'_y \qquad (1)$$

where $f'_{17}$ is the effective focal length of the objective 17, $f'_{18}$ is the focal length of the focusing device 18, $FW_y$ is the width of the linear intensity distribution in the plane 19 and $FW'_y$ is the width of the linear intensity distribution in the working plane 20.

From (1) it follows that at a given width $FW_y$ of the super-Gaussian distribution in plane 19, the focal length of the focusing device $f'_{18}$ and the required line width $FW'_y$ in the working plane 20 for the required effective focal length $f'_{17}$ of the objective 17 is yielded:

$$f'_{17} = (FW_y/FW'_y) f'_{18} \qquad (2)$$

If the plane 19 coincides with the front focal plane $F_{17}$ of the objective 17, the cylindrical lenses 21, 22 collimate the light, whereby the focusing device 18 images the super Gaussian distribution into its rear focal plane $F'_{18}$.

If the plane 19 is located at a distance $z_{SG}$ from the front focal plane $F_{17}$ of the objective 17, then the imaging takes place at a distance $\Delta z_{SG} = z_{SG} (f'_{17}/f'_{18})^2$ from the rear focal plane of the focusing device $F'_{18}$. A positive $z_{SG}$, which is to be present when the plane 19 is located between the front focal plane $F_{17}$ of the objective 17 and the first cylindrical lens 21, increases the working distance of the projection system.

The far field of the beam transformation device 13 with a Gaussian-like intensity distribution is transferred by the cylindrical lenses 21, 22 into the rear focal plane $F'_{17}$ of the objective 17. Since this focal plane $F'_{17}$ coincides with the front focal plane $F_{18}$ of the focusing device 18, the Gaussian-like distribution behind the focusing device 18 is imaged into infinity.

In the vicinity of the rear focal plane $F'_{18}$ of the focusing device 18 there is therefore only one intensity distribution, which is a super-Gaussian intensity distribution. The intensity assumes a maximum value at this point, whereby the super-Gaussian parameter G corresponds to its value at the input of plane 19.

In the following an example shall be considered in which the formation of a super-Gaussian distribution with a width $FW_y$ in transverse direction $FW_y=26$ µm is to take place in a projection system with the effective focal length $f'_{17}$ of the objective 17 $f'_{17}=8,664$ mm and the focal length $f'_{18}$ of the focusing device 18 $f'_{18}=195$ mm. Thus the focal length $f_{21}$ of the cylindrical lens 21 $f_{21}$ should be 500 mm and the distance d between the cylindrical lenses 21, 22 d=300 mm. This results in the focal length $f_{22}$ of the second cylindrical lens 22 to $f_{22}=-212$ mm, as well as the distance S between the first cylindrical lens 21 and the front focal plane $F_{17}$ of the objective 17 to S=−20,910 mm and the distance S' between the second cylindrical lens 22 and the rear focal plane $F'_{17}$ of the objective to S'=3,466 mm.

Since plane 19, in which the super-Gaussian intensity distribution from the near field of the beam transformation device 13 is arranged, cannot normally be further than about 1,000 mm from the cylindrical lens 21 in a real optical system with limited length, the super-Gaussian distribution at the exit is not arranged in the rear focal plane $F'_{18}$ of the focusing device 18, but at a distance of $(20910-1000)/(8664/195)^2=10$ mm behind it.

If a stable super Gaussian distribution is desired along the Z-axis in the vicinity of working plane 20, for example within $\pm DOF_{SG}$ (where $DOF_{SG}$ corresponds to the depth of field of the super-Gaussian distribution), then the Gaussian distribution must be arranged on the input side at a distance from plane 19 that is significantly longer than $DOF_{SG}$ $(f_{17}/f_{18})^2$. For $DOF_{SG}=0.5$ mm, for example, this is $0.5*(8664/195)^2=987$ mm. In practice, the Gauss distribution is several meters away from the beam transformation device 13, for example more than 3 meters, with optimal design. Thus, the formulated condition of depth of field is fulfilled.

Figure 7A:
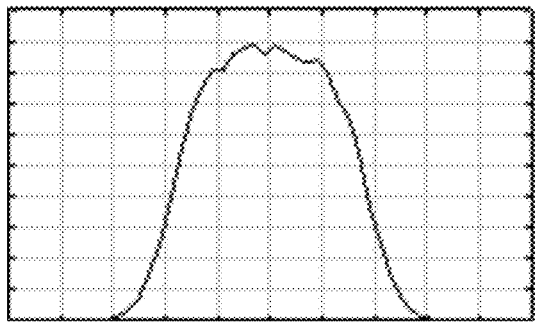
Figure 7B:
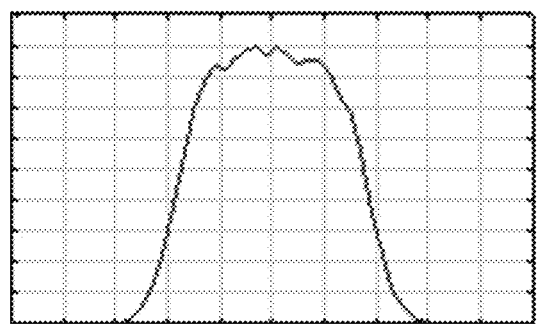
Figure 7C:
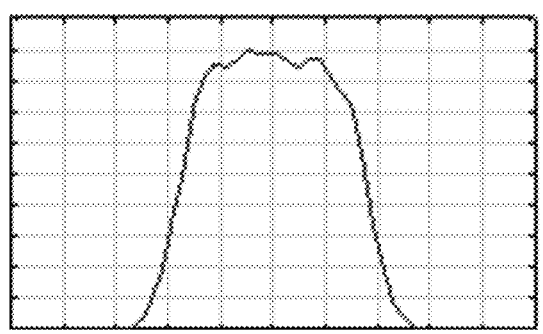
Figure 7D:
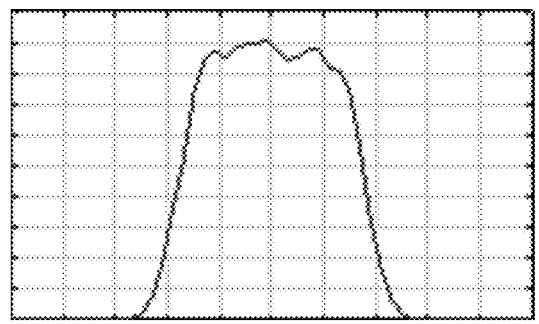
Figure 7E:
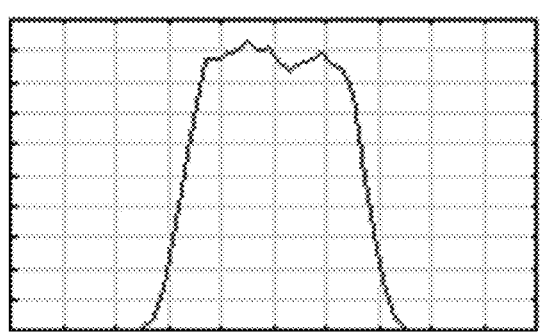
Figure 7F:
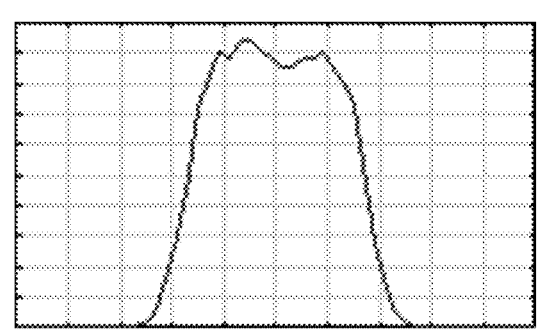
Figure 7G:
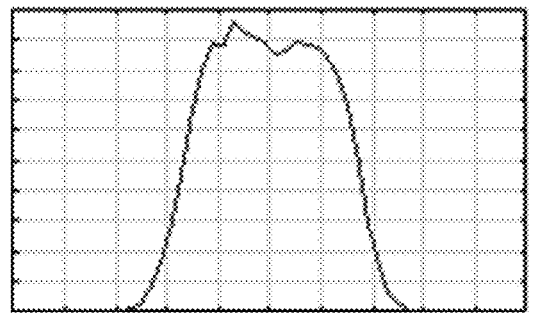
Figure 7H:
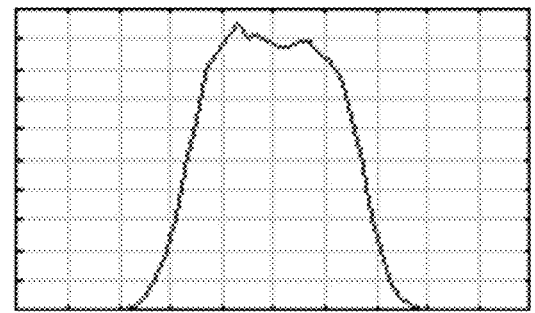

FIG. 7a to FIG. 7h show for the described example system with $FW_y=26$ µm the change of the super Gaussian profile in line transverse direction or in Y-direction for different distances Δz' from working plane 20. FIG. 7e shows the profile in working plane 20 with Δz'=0, whereas FIG. 7a shows the profile for Δz'=−0.5 mm and FIG. 7h shows the profile for Δz'=0.4 mm. It turns out that the profile hardly changes over a range of ±0.5 mm.

FIG. 8 illustrates the change in the super-Gaussian factor G as a function of the distance Δz' from the working plane 20. It shows that for the above-mentioned range of ±0.5 mm the super Gaussian factor G is essentially greater than 4.

In the embodiment shown in FIG. 3a to FIG. 3c, the long focal length objective 17 is designed as a zoom objective for the Y-direction with variable effective focal length $f'_{min}<f'_{17}<f'_{max}$. For example, the objective 17 has three cylindrical lenses 21, 22, 25, whose distance can be changed at least partially to vary the line width. The objective 17 can be constructed in such a way that when the magnification is changed by shifting the second and third cylindrical lenses 22, 25 along the optical axis or along the Z-direction, respectively, the rear objective focal plane $F'_{17}$ remains in an almost unchanged position corresponding to the front focal plane of the focusing device 18.

Accordingly, the system remains relatively insensitive to the input-side position of plane 19 in which the super-Gaussian intensity distribution from the near field of the beam transformation device 13 is arranged, the line focus remaining in the same Z-position when varying the line width.

It is also possible to change the focal length of the objective 17 by shifting the first and second cylindrical lenses 21, 22 or by shifting the first and the third cylindrical lenses 21, 25.

FIG. 3a to FIG. 3c show three configurations of the objective 17 designed as a zoom lens with different magnifications, which lead to different widths of the super-Gaussian line in the working plane 20.

The second and third cylindrical lenses 22, 25 are movable in the pictured version. Three magnifications $V=FW'_y/FW_y=f'_{18}/f'_{17}$ are achieved by three different focal lengths $f'_{17}$ of the lens 17.

For example, the cylindrical lenses 21, 22, 25 of objective 17 may have focal lengths $f'_{21}=-450$ mm, $f'_{22}=216$ mm and $f'_{25}=-123$ mm and the focusing device 18 may have a focal length $f'_{18}=195$ mm.

For the first configuration according to FIG. 3a this results in a longer focal length $f'_{17}=12,878$ mm and a distance S'=4,239 mm.

For the second configuration according to FIG. 3b there is a medium focal length $f'_{17}=10,009$ mm and a distance S'=4,284 mm.

For the third configuration according to FIG. 3c a shorter focal length $f'_{17}=7,912$ mm and a distance S'=4,190 mm result.

With an input-side width of the super-Gaussian distribution $FW_y=2.2$ mm, the super-Gaussian line width $FW_y$ can be varied between 34 µm and 55 µm with the zoom objective.

In the above example, in extreme zoom configurations, the rear focal plane $F'_{17}$ of objective 17 shifts by up to ±47 mm relative to the front focal plane $F_{18}$ of focusing device 18. This shift also affects the location of the Gaussian distribution behind focusing device 18. If for a medium zoom configuration, e.g. according to FIG. 3b, where the Gaussian-like far field image is located in infinity, the Gaussian distribution for the extreme zoom configurations may be located in the Z position of $\pm(f'_{18})^2/\Delta z=\pm 809$ mm relative to the super-Gaussian distribution in the working plane 20. Since this distance is large compared to the desired $DOF_{SG}$, the depth of field of the super-Gaussian distribution is not affected.

The invention claimed is:

1. A device comprising
   a laser light source configured to emit light during operation of the device,
   optics that shape the light with respect to beam cross-sections of the light and divergences of the light in a first direction, a second direction, or both the first direction and the second direction, the first direction and the second direction being perpendicular to each another and perpendicular to a propagation direction of the light,
   a beam transformation device on which the light shaped by the optics impinges, the beam transformation device configured to increase a beam quality factor with respect to the first direction and decreasing a beam quality factor with respect to the second direction, and an objective acting in the second direction and a focusing device acting in the second direction arranged behind the objective, wherein the objective and the focusing device are configured to image a plane behind the beam transformation device into a working plane, wherein the light in the second direction has an intensity distribution with a super-Gaussian profile.

2. The device according to claim 1, wherein the objective has a focal length between 2,000 mm and 30,000 mm, between 5,000 mm and 20,000 mm, or between 7,000 mm and 13,000 mm.

3. The device according to claim 1, wherein the objective comprises cylindrical lenses acting in the second direction.

4. The device according to claim 1, wherein the objective comprises three lenses acting in the second direction, at least one of which is movable relative to the other lenses.

5. The device according to claim 1, wherein the focusing device comprises one or more lenses acting in the second direction.

6. The device according to claim 1, wherein a rear focal plane of the objective coincides with a front focal plane of the focusing device.

7. The device according to claim 1, wherein plane imaged by the objective and the focusing device is arranged between a front focal plane of the objective and the objective.

8. The device according to claim 1, wherein the depth of field of the profile of the intensity distribution in the working plane is greater than 0.1 mm, or greater than 0.5 mm; wherein the depth of field is a region where a super-Gaussian factor of the intensity distribution in the second direction is greater than 3.

9. The device according to claim 1, wherein the intensity distribution has a greater intensity in the working plane than in planes arranged immediately in front of or behind it.

10. The device according to claim 1, wherein the laser light source is a multimode laser light source.

11. The device according to claim 1, wherein the optics are between the laser light source and the beam transformation device and are anamorphic optics.

12. The device according to claim 1, wherein the device comprises a homogenizing device acting in the first direction.

13. The device according to claim 12, wherein the homogenizing device is arranged behind the beam transformation device.

14. The device according to claim 12, wherein the homogenizing device comprises two cylindrical lens arrays and a Fourier lens acting in the first direction.

* * * * *